United States Patent
McGreer et al.

(10) Patent No.: US 8,565,600 B2
(45) Date of Patent: Oct. 22, 2013

(54) OPTICAL NETWORK CONFIGURATIONS WITH MULTIPLE BAND MULTIPLEXING AND DE-MULTIPLEXING AND AWG STRUCTURES WITH MULTIPLE BAND PROCESSING

(75) Inventors: Kenneth McGreer, Livermore, CA (US); Brian McGinnis, Livermore, CA (US); Anthony J. Ticknor, Cupertino, CA (US); Calvin Ho, San Jose, CA (US)

(73) Assignee: NeoPhotonics Corporation, San Jose, CA (US)

( * ) Notice: Subject to any disclaimer, the term of this patent is extended or adjusted under 35 U.S.C. 154(b) by 229 days.

(21) Appl. No.: 13/157,462

(22) Filed: Jun. 10, 2011

(65) Prior Publication Data

US 2012/0315044 A1    Dec. 13, 2012

(51) Int. Cl.
*H04J 14/00*    (2006.01)
*H04J 14/02*    (2006.01)

(52) U.S. Cl.
CPC .................................. *H04J 14/0282* (2013.01)
USPC ................... 398/68; 398/67; 398/82

(58) Field of Classification Search
USPC ............... 398/66–68, 70, 72, 87, 82
See application file for complete search history.

(56) References Cited

U.S. PATENT DOCUMENTS

| | | | |
|---|---|---|---|
| 5,002,350 A | 3/1991 | Dragone | |
| 5,982,960 A | 11/1999 | Akiba et al. | |
| 6,069,990 A | 5/2000 | Okawa et al. | |
| 6,374,013 B1 | 4/2002 | Whiteaway et al. | |
| 6,434,292 B1 * | 8/2002 | Kim et al. | 385/24 |
| 6,456,763 B2 | 9/2002 | Kashihara et al. | |
| 6,678,446 B1 | 1/2004 | McGreer et al. | |
| 6,768,827 B2 * | 7/2004 | Yoo | 385/14 |
| 7,062,127 B2 | 6/2006 | Purchase et al. | |
| 7,209,612 B2 | 4/2007 | Balakrishnan et al. | |
| 7,272,273 B2 | 9/2007 | Yan et al. | |
| 7,440,655 B2 | 10/2008 | Grek et al. | |
| 7,539,364 B2 | 5/2009 | Cole et al. | |
| 7,720,328 B2 | 5/2010 | Yan et al. | |
| 8,238,750 B2 * | 8/2012 | Rossetti et al. | 398/72 |
| 2005/0129363 A1 * | 6/2005 | McGreer | 385/37 |
| 2008/0279230 A1 * | 11/2008 | Dagenais | 372/20 |
| 2008/0310841 A1 * | 12/2008 | Lee et al. | 398/63 |
| 2012/0087667 A1 * | 4/2012 | Bulthuis | 398/79 |

FOREIGN PATENT DOCUMENTS

| | | |
|---|---|---|
| WO | 2005114288 A1 | 1/2005 |
| WO | 2008010866 A2 | 1/2008 |
| WO | 2008056843 A1 | 5/2008 |

\* cited by examiner

*Primary Examiner* — Dalzid Singh
(74) *Attorney, Agent, or Firm* — Dardi & Herbert, PLLC; Curtis B. Herbert; Peter S. Dardi

(57) ABSTRACT

Optical networks can comprise a branch structure with the de-multiplexing/multiplexing structure that operates to disperse a plurality of optical bands. Thus, the optical network comprises an optical network connection with a common optical channel, a plurality of de-multiplexed branch optical service connections and the de-multiplexing/multiplexing structure. In some embodiments, one optical band can be used to deliver input from a common channel to the branch node and the other optical band can carry output along the common channel from the branch node. The de-multiplexing/multiplexing element can be an arrayed waveguide grating. The AWG can have desirable architecture to efficiently provide the corresponding functions with respect to the two optical bands. Appropriate photodetectors and light sources can be associated with the AWG.

18 Claims, 6 Drawing Sheets

OPTICAL NETWORK CONFIGURATIONS WITH MULTIPLE BAND MULTIPLEXING AND DE-MULTIPLEXING AND AWG STRUCTURES WITH MULTIPLE BAND PROCESSING

FIELD OF THE INVENTION

The invention relates to networks constructed with a device for performing multiple band multiplexing and de-multiplexing, such as an improved arrayed waveguide gratings. The invention further relates to arrayed waveguide gratings designed for improved network connections to simplify overall network structure through the ability to multiplex and de-multiplex a plurality of wavelength bands.

BACKGROUND OF THE INVENTION

Optical networks generally comprise transmission components that are designed to transmit bands of wavelengths over reasonable distances. The bands of wavelengths generally comprise signals intended for a plurality of customers/users. Thus, a single optical fiber can be used to simultaneously transmit a plurality of signals that are subsequently divided for delivery. Similarly, individual signals are combined for transmission over common lines prior to eventual division for routing and/or delivery. Individual bands thus are divided into smaller wavelength ranges corresponding to signals relating to individual users, and multiplexing and de-multiplexing functions can be used to convert between combined signals for common lines and individual signals for routing and/or interfacing with individual users.

Arrayed waveguide gratings (AWG) are planar optical circuit components that are designed to perform multiplexing and de-multiplexing functions for optical signals. An AWG generally comprises two broadly transmitting optical elements, such as slab waveguides, that are connected by an array of waveguides with a range of lengths. The length differences of the dispersive waveguide array are selected to result in appropriate constructive and destructive interference between light transmitted by the array of waveguides such that a multi-chromatic signal is spatially spread out by the interference pattern such that smaller wavelength ranges can be separately transmitted following de-multiplexing. Similarly, transmission of light in the opposite direction results in the transmission of a combined multi-chromatic signal relative to a group of input signals with different wavelengths within a range of wavelengths.

SUMMARY OF THE INVENTION

In a first aspect, the invention relates to an optical network comprising an optical network connection, a plurality of branch service optical connections, and a D/MUX structure comprising a dispersing element. The D/MUX structure optically connects the network connection with the plurality of branch connections. Generally, the plurality of branch connections comprises two groups of optical connections respectively carrying distinct optical bands with a first optical band being used for input into the optical network connection and the second optical band being used for output from the optical network connection and wherein the D/MUX structure provides multiplexing and/or de-multiplexing of distinct bands with respect to the network connection for connection to the plurality of branch connections.

In a further aspect, the invention relates to a method for interfacing an optical network connection with a plurality of branch service optical connections. The method comprises providing D/MUX operation with respect to two bands of optical signals associated with the network connection that are interfaced with the plurality of branch connections wherein each of the plurality of branch connections comprise two optical connections carrying distinct bands corresponding with the two bands of the network signal. The distinct bands are optically associated with sets of dispersed waveguides corresponding with each of the optical bands.

In another aspect, the invention pertains to an arrayed waveguide grating comprising a planar substrate, a first coupling waveguide on the planar substrate, a second coupling waveguide on the planar substrate, a plurality of arrayed waveguides optically connected to the first coupling waveguide and the second coupling waveguide and on the planar substrate, a first common connection, a second common connection, and a plurality of dispersed waveguides. The first common connection is optically interfaced with the first coupling waveguide opposite the arrayed waveguides with a configuration suitable to exchange light of a first wavelength band with the arrayed waveguides. The second common connection is optically interfaced with the first coupling waveguide opposite the arrayed waveguides with a configuration suitable to exchange light of a second wavelength band with the arrayed waveguides. In some embodiments, the plurality of dispersed waveguides is optically interfaced with the second coupling waveguide opposite the arrayed waveguides with a configuration to exchange light of a suitable wavelength with the arrayed waveguides. The arrayed waveguides are configured for the separation of the first wavelength band and the second wavelength band, and the plurality of dispersed waveguides comprise groups with a plurality of waveguides corresponding to each optical band.

Furthermore, the invention pertains to an arrayed waveguide grating comprising a planar substrate, a first coupling waveguide on the planar substrate, a second coupling waveguide on the planar substrate, a plurality of arrayed waveguides optically connected to the first coupling waveguide and the second coupling waveguide and on the planar substrate, a common connection, a plurality of dispersed waveguides and an optical detector. The common connection is optically interfaced with the first coupling waveguide opposite the arrayed waveguides with a configuration suitable to exchange light of two optical wavelength bands with the arrayed waveguides. The plurality of dispersed waveguides are optically interfaced with the second coupling waveguide opposite the arrayed waveguides with a configuration to exchange light of a suitable wavelength with the arrayed waveguides, in which the arrayed waveguides are configured for the separation of a plurality of optical bands and wherein the plurality of dispersed waveguides comprise groups with a plurality of waveguides corresponding to each wavelength band. The optical detector optically connected to the planar optical structure to directly receive light from a dispersed waveguide.

In other aspects, the invention pertains to an arrayed waveguide grating comprising a planar substrate, a first coupling waveguide on the planar substrate, a second coupling waveguide on the planar substrate, a plurality of arrayed waveguide on the planar substrate optically connected to the first coupling waveguide and the second coupling waveguide, a first set of a plurality of dispersed waveguides and a second set of a plurality of dispersed waveguides. In some embodiments, the first set of a plurality of dispersed waveguides optically interfaced with the first coupling waveguide opposite the arrayed waveguides with a configuration suitable to exchange light with the arrayed waveguides, and the second set of a plurality of dispersed waveguides optically interfaced with the second coupling waveguide opposite the arrayed waveguides with a configuration to exchange light with the arrayed waveguides. The first set of waveguides can comprise a common waveguide for a first optical band and a set of dispersed waveguides for separate de-multiplexed wavelengths from a second optical band, and the second set of waveguides can comprise a common waveguide for the second optical band and a set of dispersed waveguides for separate de-multiplexed wavelengths from the first optical band. Generally, the arrayed waveguides are configured to perform a D/MUX function with respect to the first optical band between the common waveguide for the first band and the set of waveguides for the dispersed modes of the first optical band as well as to perform a D/MUX function with respect to the second optical band between the common waveguide for the second optical band and the set of waveguides for the dispersed modes of the second optical band.

DETAILED DESCRIPTION OF THE INVENTION

Figure 1:
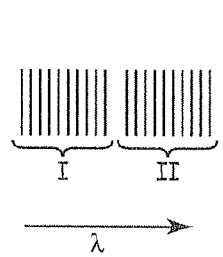
FIG. 1 is a schematic one dimensional plot of two wavelength bands with sequential signals with respect to wavelength.

Optical networks described herein can have a network connection(s) designed to transmit a plurality of wavelength bands through one or more optical elements that has de-multiplexing capability to interface with individual user or branched service optical connections. Generally, one band of optical signals corresponds with a plurality of input signals, and one band of optical signals corresponds with a plurality of output signals. The ability to split or combine the optical signals relating to individual branched lines, e.g., customer lines, involving a plurality of bands provides for significant simplification and cost reduction for individual user interfaces with the network. In some embodiments, a suitable multiplexer/de-multiplexer comprises a specifically designed AWG interfaced between one or more common optical connections and a plurality of user service optical connections or other branch service optical connection. Specifically, the AWG can be designed with an appropriate order to split a plurality of optical bands into individual signals while having corresponding suitable connections based on the appropriate network design. The corresponding cost reductions associated with the simpler overall network architecture can make optical communication system more accessible.

Networks generally involve appropriate switching functions to route signals from a sender to a receiver. To have efficient transmission and routing systems, individual signals are generally combined for longer range transmission and later separated for proper routing to the intended recipient. The distinct signals can be identifiable through using a separate wavelength value or range associated with each distinct signal. While these general principals can extend to various transmission technologies, optical signals are of particular interest here. Optical signals present the ability to transmit large amounts of information, although optical signals present distinct challenges regarding handling of the optical signals. Also, while the network functions described herein can be useful at various points in network designs, the particular architecture can be of significant advantage with respect to signals at the customer/user interface end of a passive optical network. While for convenience the discussion herein focuses on a network terminus providing user service optical connections, the structures can be similar adapted for other branches of an optical network making use of multiplexing and de-multiplexing functions in which the de-multiplexed connections can be referred to as branch service optical connections, such as user service optical connections.

The combination of a plurality of signals, e.g., optical signals, for common transmission can be termed multiplexing, which indicates that signals of different wavelengths are combined within a common signal. The separation of the combined signals, e.g., optical signals, having different wavelengths can be referred to as de-multiplexing. Some devices perform multiplexing using optical signals transmitted in one direction and de-multiplexing with respect to optical signals transmitted in the opposite direction so that a common device can be used for both functions. The expression "D/MUX" is used herein to indicate a device or a structure that can be connected to perform either multiplexing or de-multiplexing or that can perform both multiplexing and de-multiplexing simultaneously. In general, various suitable optical devices can be used to perform the D/MUX functions. Arrayed waveguide gratings perform efficient and compact D/MUX functions for optical signals.

An improved network architecture involves an element in the network that provides for the D/MUX function with respect to a plurality of bands. Generally, a band can be identified as a collection of optical channels, in which an individual optical channel carries a single optical signal. An individual optical signal is centered at a specific optical wavelength. In some embodiments, a plurality of optical bands can cover distinct wavelength ranges, such as contiguous wavelength ranges. In some embodiments of particular interest, one optical band comprises channels that are transmitted over a common line for input to a plurality of user connections and a second band that is transmitted over a common line for output from a plurality of user connections, and additional bands can carry further appropriate optical signals. In alternative or additional embodiments, an input band and an output band comprises overlapping, interspersed wavelength slots.

An optical network can comprise a network connection, a plurality of user optical service connections and a D/MUX structure, such as an arrayed waveguide grating, optically connecting the network connection and the plurality of user optical service connections. The network connection comprises one or more common optical connections. The common connections are generally optically connected to common channels that transmit multiple wavelength optical signals over a network, which in some embodiments can involve significant distances. In some embodiments, the user optical connections can comprise separate connections associated with an input and output signals from the user, although the output signal can be a broadband signal such that the multiplexing operation selects the appropriate wavelength for transmission for that user.

In general, the efficient network architecture described herein can be integrated into a range of network formats. In particular, the D/MUX structures described herein can be effectively used as a component of a passive optical network (PON), for example to provide an interface at a branch in a network, such as where a shared network line is distributed among a plurality of user lines providing access to a plurality of individual network terminations serving individual users. In a passive optical network, passive optical components provide traffic routing between a Central Office and termination points, which can be at user/customer premises. In general, network can provide one or more of voice, video, data, or other communication services, such as backhaul of wireless communications, which can be provided by multiple service providers. For example, the optical network can provide for transmission of broadband internet service provided by an internet service provider. However, the D/MUX structures described herein can be used for the connection of alternative network branch segments, in addition or as an alternative to providing an interface with direct user/customer channels. In embodiments in which a direct interface is provided to user connections, the user connections can be directly or indirectly connected to appropriate transmitters and receivers, which respectively originate or terminate a signal.

To form the desired network connections, the optical transmissions associated with common channels are de-multiplexed with respect to a plurality of sets of connections, such as user service optical connections, with each set of connections corresponding to a separate band. In some embodiments, a user can interface with signals from one or more connections for two of more distinct bands, generally with a connection for one band being associated with input and a connection for a second band being associated with output. The de-multiplexed connection can be integrated with optical transmission elements, such as waveguides and/or optical cables. Alternatively or additionally, one or more de-multiplexed connections can be optically connected to a transducer to convert between optical and electrical signals such that the optical line can have a terminus for the particular connection.

In some embodiments, the multi-band D/MUX function can be performed with a series of wavelength filters. Each filter can split off a particular channel such that a series of filters can sequentially split off all of the desired channels corresponding with the user service optical connections. Similarly, a diffraction grating can be used to disperse a common signal. Different orders of the diffracted light can overlap from the grating. The properties of the grating can be made to provide for desired spatial separation of the wavelength range under consideration such that the different signals can be directed to the appropriate channel covering a particular wavelength of an individual user service optical connection.

Planar optical circuits provide convenient, easily integrated, and compact formats for optical communication components. Arrayed waveguide gratings (AWG) provide D/MUX functions within a planar optical circuit format. Improved AWG described herein can be integrated into the optical network structures to provide the desired multiple-band D/MUX operation that provides the simplified network structure described herein. The planar AWG structure can be integrated with additional planer devices and or interfaced with appropriate external optical elements to provide desired integration into the network.

Arrayed waveguide gratings are planar D/MUX elements that comprise an array of waveguides of different lengths forming a dispersive grating and connected on respective ends with a coupling waveguide, which is a very broad waveguide for coupling optical signals between the various optical access ports of the device and the grating array of waveguides. Each coupling waveguide has an extended planar dimension that provides for broad wavelength transmission as well as providing for interference and corresponding dispersion of the signals associated with the waveguide array. The dispersive waveguide array can optionally comprise various performance enhancements that have been developed in the art. For example, athermal AWG designs are described in U.S. Pat. No. 7,062,127 to Purchase et al., entitled "Athermal AWG and AWG with low Power Consumption using Groove of Changeable Width," incorporated herein by reference.

In some PON networks, AWGs have been used that are purposely designed to approximately overlap different diffraction orders of two optical bands such that one or more wavelengths from each of a plurality of bands are routed to be subsequently directed to a single user connection or channel. For these systems, each user generally has a wavelength-division multiplexed (WDM) biplexer or the like to split/combine the signals corresponding to the different bands. One band can be used by a user for receiving a signal, and a second band can be used for transmitting a signal.

The AWGs integrated into the networks described herein have a dispersion order that is selected to spatially disperse a plurality of optical bands so that the resulting channels of each band can be separately directed to distinct connections. The separate connections of different bands can be directed to users such that a single user is connected with access to a plurality of bands. In some embodiments, a dispersed signal of one band is used for transmitting from a user while a dispersed signal of another band is used for receiving an input signal at a user location. In these embodiments, the ability for one D/MUX structure to simultaneously process a plurality of bands provides for a simplified and efficient network architecture.

In some embodiments, the AWG has one or more common connections interfaced with a first coupling waveguide and a plurality of sets of dispersed optical connections are interfaced with a second coupling waveguide of the AWG with one set of dispersed optical connections for each band. For example, if one common connection is interfaced with the first coupling waveguide, the common connection is configured to carry signals associated with a plurality of optical bands. In additional or alternative embodiments, a plurality of common connections optically connected to a first coupling waveguide provide signals associated with a plurality of bands, in which each of the plurality of common connections can provide a signal associated with one or more optical bands.

In further embodiments, each of the two coupling waveguides of the AWG has an optical connection with one or more common connections as well as one or more sets of dispersed optical connections. The connections of each coupling waveguide correspond with appropriate connections of the opposite coupler element. For example, a common connection of one coupler element corresponds with one or more sets of dispersed optical connections with one set of dispersed optical connections for each band of the common connection. Thus, in some embodiments, each coupling waveguide is optically connected to one common connection configured to carry one band and to one set of dispersed optical connections configured to disperse the band carried by the common connection that is connected to the opposite coupling waveguide and visa versa. This configuration with both common connections and dispersed optical connections associated with each coupling waveguide of the AWG provides for a more compact and simplified configuration of the AWG and associated planar optical circuit.

In general, the common connections and the dispersed optical connections are integrated into a planar optical structure such that they interface with planar optical waveguides. These planar optical waveguides can be interfaced with additional components of a planar optical circuit and/or transmitted to a coupler for subsequent transmission over an optical fiber or the like. At the central office, which provides the PON termination for the physical Service Provider who in turn interfaces all the individual PON users back through to the global network, it is generally necessary and desirable to convert between optical signals and electrical signals associated with the dispersed optical connections in the physical vicinity of the D/MUX device. As described further below, optical receivers can be secured directly to the planar optical structure supporting the AWG. Suitable lasers can be coupled into appropriate dispersed optical connectors of the AWG using optical fibers and suitable optical connectors. Thus, the advantages of simplified longer distance optical transmission of high bandwidth signals in a PON can be adapted and interfaced to the more complex and more rigorous requirements of a highly-structured metropolitan or long-haul network The optical network architectures with improved D/MUX functionality as described herein provide for simplified and more efficient user/branch interfaces. In particular, a plurality of biplexers normally required at the central office can be eliminated relative to conventional configurations to significantly simplify the local termination and facilitate the cost-effective integration of expensive network elements, such as discrete biplexers. Similarly, the improved network architecture provides for greater flexibility with respect to common network connections. In some embodiments, the AWG provide the desired improved D/MUX functionality in a compact and efficient planar optical circuit format.

Network Architecture

The optical networks described herein comprise a D/MUX component that provides a desirable connection configuration between a common connection configured to carry a plurality of optical bands and a de-multiplexed group of connections that individually are associated with the one band as well as one particular signal within the band. With respect to the common connection, a first optical band is associated with an input transmission relative to the D/MUX component, and a second optical band is associated with an output transmission relative to the D/MUX component. The D/MUX function is useful with respect to placement in an optical network at a branch point. At the branch point a multiplexed signal is divided into the individual, i.e., de-multiplexed, signals for routing purposes and possibly other manipulations. The branch point can be at a terminus of the optical network in which the divided signals are managed by the Service Provider to support the appropriate user connections for the delivery and/or origination of optical communications with respect to a customer/user of the optical data. Improved D/MUX structures can effectively handle the multiple bands of the common lines such that more efficient network connections can be made.

Optical communication signals are generally transmitted over longer distances using an optical fiber or the like. The ability to transmit wavelength-division multiplexed (WDM) signals over the optical fiber or other light conduit provides for a significant increase in the transmission efficiency since a plurality of optical signals can be transmitted over the optical fiber at one time. To make effective use of WDM signals, the network comprises components with the ability to multiplex and de-multiplex the optical transmission. The individual signals differ from each other with respect to relatively small differences in the wavelength. A group of signals differing in wavelengths that are commonly transmitted generally is referred to as a band of wavelengths. The properties of the optical fiber and other optical components generally are matched to the wavelength range for efficient manipulation. For example, optical fiber cores generally have dimensions and indices of refraction matched to the light wavelength range, and the light sources clearly are selected based on the appropriate wavelength of light emissions.

Figure 2:
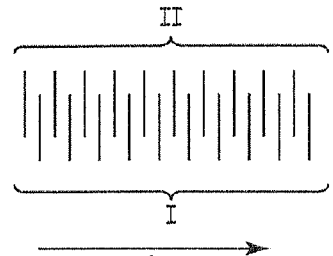
FIG. 2 is a schematic one dimensional plot of signals as a function of wavelength for two wavelength bands with interspersed wavelength values being associated with the respective bands.
Figure 3:
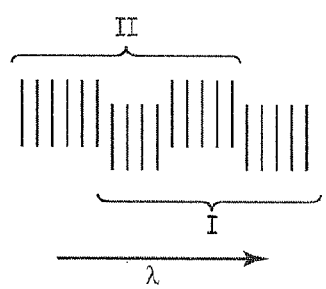
FIG. 3 is a schematic one dimensional plot of signals as a function of wavelength for two wavelengths bands in which the signals of the two bands are not sequential with respect to wavelength.

The component of the network that transmits the combined, i.e., multiplexed, optical signals can be referred to as a common line, and a common line can be used for longer range transmissions that reach out to the vicinity of many users. The common line can be used to also transmit optical signals in both directions over the common line. The two groups of signals propagating in opposite directions are generally configured as separate bands, and different wavelengths are used for input and output relative to the branch point in the optical network for easier isolation and manipulation of the signals. In present commercial optical systems, the distinct bands for transmission in opposite directions are spaced apart in wavelength, as schematically depicted in FIG. 1. Examples of currently used wavelength bands include, for example, C-band (1530 nm-1560 nm), E-band (1420 nm-1450 nm), L-band (1570 nm-1600 nm), O-band (1300 nm-1330 nm), and S-band (1490 nm-1520 nm), although alternative bands can be used as desired. However, in some embodiments, the bands of signals traveling in opposite directions over the common line can be interspersed, as shown in FIG. 2 or otherwise overlapping, for example, as shown in FIG. 3.

Figure 4:
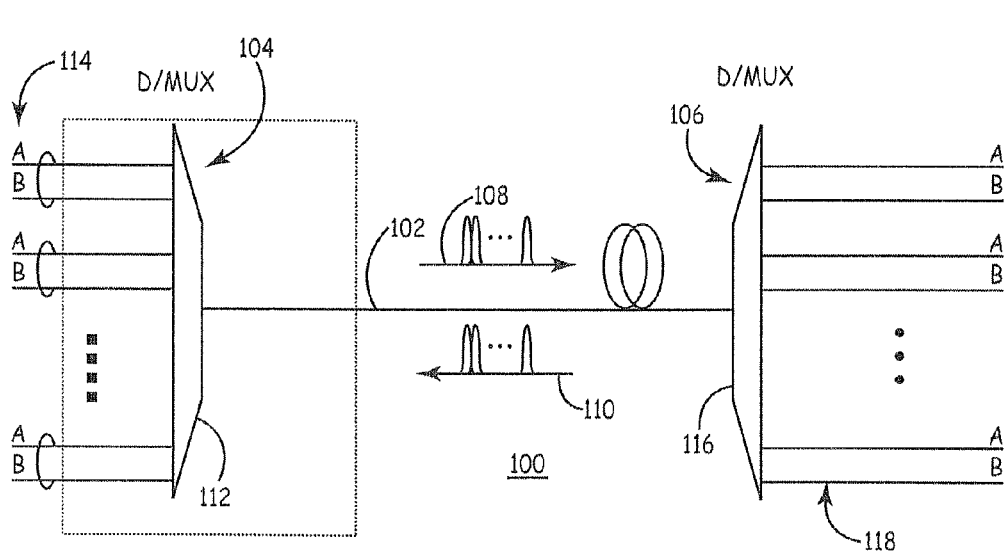
FIG. 4 is a schematic diagram of a segment of an optical network with two branch nodes having a D/MUX element as described herein.

A portion of an optical network connecting two branch points is shown in FIG. 4. Optical network 100 comprises common line 102, branch node 104 and branch node 106. Common line 102 is configured to carry two optical bands that travel in opposite directions, as depicted schematically by right arrow 108 and left mow 110. Branch node 104 comprises a D/MUX element 112 and de-multiplexed lines 114. Similarly, branch node 106 comprises D/MUX element 116 and de-multiplexed lines 118. As shown in this figure, de-multiplexed lines from the respective bands are paired together with A and B indicating the respective bands. Each pair of de-multiplexed lines indicates an input signal (band A) and output signal (band B) corresponding to a particular address, such as a customer address, a service provider address or the like.

Figure 5:
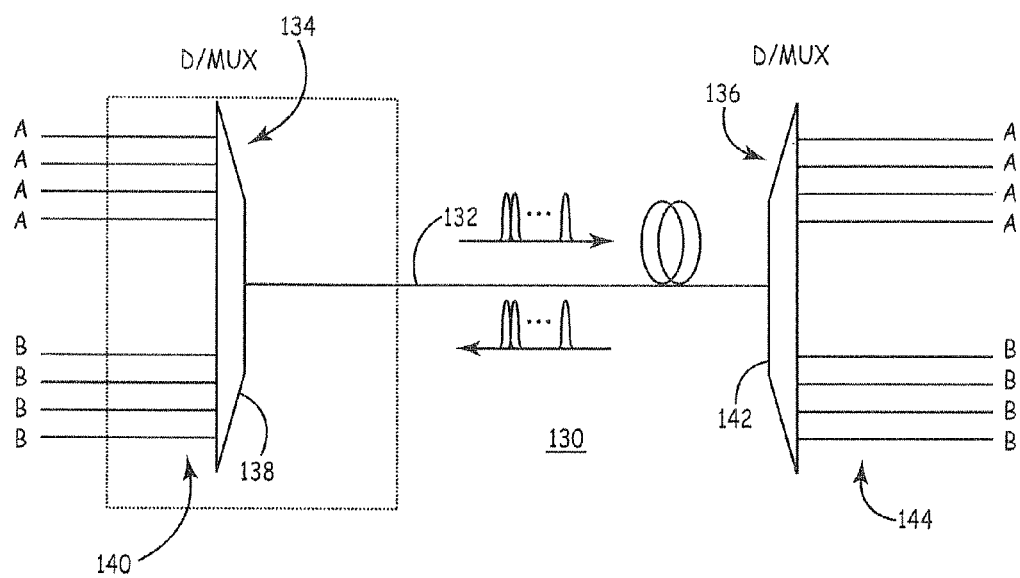
FIG. 5 is a schematic diagram of an alternative embodiment of a segment of an optical network with two branch nodes.
Figure 6:
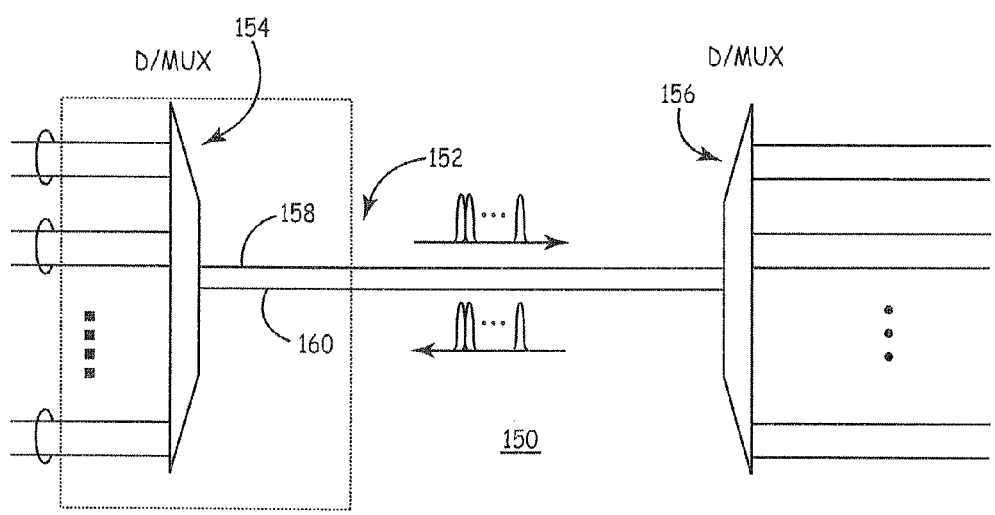
FIG. 6 is a schematic diagram of another alternative embodiment of a segment of an optical network with two branch nodes.

Alternative optical network architectures are shown in FIGS. 5 and 6. If the optical band wavelengths are sequentially organized and spaced apart relative to wavelengths of another optical band, as shown in FIG. 1, then the D/MUX structure can spatially separate the light from the optical bands similarly. Of course, light from the de-multiplexed connections of the D/MUX can be directed to optical fibers, which can then be spatially organized as desired. For example, the optical fibers can be grouped to mate related signals in the two bands, as shown in FIG. 4.

Alternatively or additionally, some or all of the de-multiplexed connections can be kept in a spatial arrangement with the respective bands separated for further processing, as shown in FIG. 5. Referring to FIG. 5, network 130 comprises common line 132, branch node 134 and branch node 136. Common 132 is configured to carry the signal of two bands. Branch node 134 comprises D/MUX element 138 and de-multiplexed lines 140. Similarly, branch node 136 comprises D/MUX element 142 and de-multiplexed lines 144. De-multiplexed lines 140 and de-multiplexed lines 144 are spatially groups according to the optical bands, which are noted as A and B. Of course, any variations combining features of the embodiment in FIG. 4 and in FIG. 5 are contemplated, such as one node being configured as in FIG. 4 and one node being configured as shown in FIG. 5, or subsets of de-multiplexed lines being configured as shown in FIG. 4 and another subset of lines being configured as shown in FIG. 5, or combinations thereof.

Referring to FIG. 6, optical network 150 comprises common line 152, branch node 154 and branch node 156. Common line 152 comprises two physically distinct optical channels 158, 160, which can be, for example, two optical fibers. Optical channels 158 and 160 are configured to carry separate optical bands. Optical channel 158 carries an optical band that travels from left to right in the schematic depiction in the drawing, and optical channel 160 carries an optical band that travels from right to left in the schematic depiction in the drawing. Common line 152 can comprise additional separate optical channels for additional optical bands in some embodiments. While branch node 154 and branch node 156 are shown with a configuration of de-multiplexed connections as shown in FIG. 4, the variation discussed in reference to FIG. 5, can similarly be used with respect to this embodiment of the common line.

In some embodiments, the relevant segment of the optical network comprises a passive optical network (PON) connecting a central office with a termination point in proximity with customer premises. The PON has passive optical components directing the optical traffic between the two locations. Through the use of passive components that do not have power or processing requirements, the maintenance costs for the system are reduced. In a wavelength-division multiplexing PON (WDM-PON), multiple signals are transmitted over a common line, in which the signals are appropriately subjected to multiplexing and de-multiplexing for routing purposes. The improved D/MUX structures described herein can be integrated into the WDM-PON. General WDM-PON architecture is described further in published PCT application WO 2008/010866A to Novera Optics Inc., entitled "Open Access Service Model Using WDM-PON," incorporated herein by reference.

Figure 7:
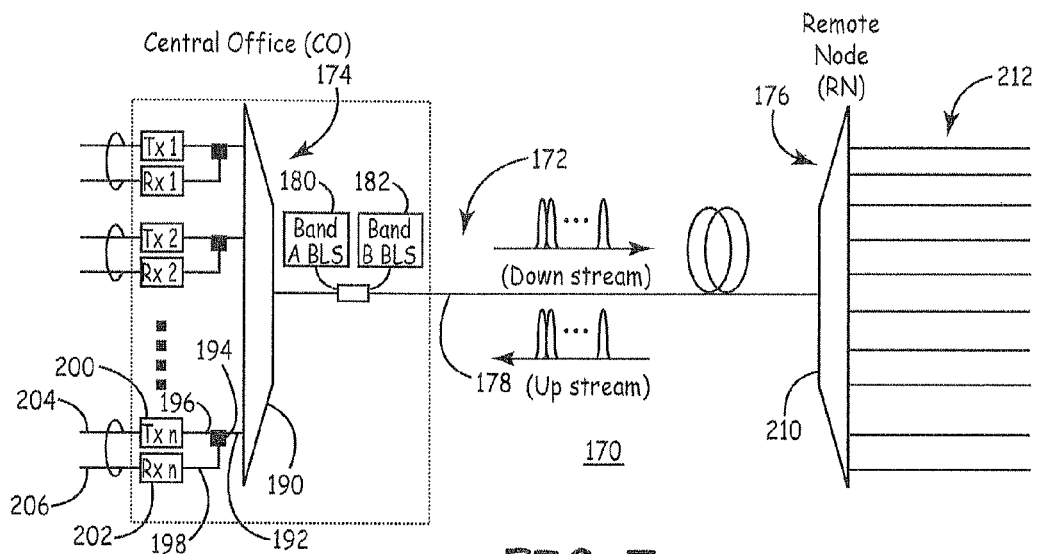
FIG. 7 is a schematic diagram of a PON with a user terminus at the end of an optical network.

A WDM-PON with an improved D/MUX structure integrated into the system at the customer terminus is shown in FIG. 7. Optical network 170 comprises a common line 172, a central office node 174 and a terminus node 176. In this embodiment, common line 172 comprises a single optical channel 178 for carrying multiple optical bands, although separate optical channels can be used if desired. In some embodiments, common line 172 further comprises broadband light sources 180, 182 for the two optical bands that are transmitted along optical channel 178. Broadband light sources 180, 182 respectively are transmitted in the two directions of optical channel 178 in the opposite direction of the corresponding communication signals of the respective optical band. The light from the sources 180, 182 can facilitate mode locking of a broadband transmitter signal at the appropriate wavelength upon de-multiplexing at the ends of optical channel 178 and transmission to the communication transmitter.

In this embodiment, central office node 174 comprises a circular multiplexer/de-multiplexer 190, and a plurality of service provider connections 192. One representative service provider connection is labeled in FIG. 7. Multiplexer/de-multiplexer 190, such as a circular AWG, is designed so that different orders of the two optical bands overlap at the de-multiplexed connections, so that the corresponding dispersed components of each band are transmitted together at the de-multiplexed connections. Each service provider connection 192 is optically connected with a biplexer 194 that separates the components corresponding to the two bands that are optically connected to two optical channels 196, 198. Optical channel 196 of each pair is optically connected to a transmitter 200, and optical channel 198 of each pair is optically connected to a receiver 202. Transmitter 200 and receiver 202 are further connected to service provider connections 204, 206 for providing appropriate communications with the service provider. If desired, central office node 174 can comprise a D/MUX structure as described herein, as a replacement for multiplexer/de-multiplexer 190 and biplexers 194.

Terminus node 176 comprises D/MUX structure 210 and a plurality of dispersed connections 212. Dispersed connections 212 comprise optical connections corresponding to both bands that are transmitted over common optical channel 178. Dispersed connections 212 can be configured as desired, such as in the configurations shown in FIGS. 4 and 5 or in another reasonable configuration. Dispersed connection can be directed to a customer facility, such as an office, a commercial building, a residence or the like, for further processing with one optical channel from each band for providing input and output functions. In alternative or additional embodiments, some or all of the dispersed optical connections can be interfaced with an appropriate receiver or transmitter in the vicinity of the D/MUX structure such that electrical signals can be used for shorter range communication to the service provider or customer interface. Generally, herein being in the vicinity refers to being within 100 meters, in some embodiments within about 10 meters and in other embodiments within 1 meter of the D/MUX structure. A person of ordinary skill in the art will recognize that additional ranges are contemplated and are within the present disclosure.

In the embodiments of particular interest, the D/MUX structure components incorporated at the network branches perform de-multiplexing and multiplexing functions for a plurality of optical bands such that input and output signals for the common line are dispersed. The dispersed signals of the respective bands can then be manipulated independently of corresponding signals of the other band. Thus, significantly simplified network architecture can be used overall. As noted above, various arrays of filters, diffraction grating and the like can be used to perform the D/MUX functions. In some embodiments, an AWG with appropriate design parameters is a desirable D/MUX element to perform the multiple band dispersion functions. In some embodiments, a single dispersive element, such as an AWG or a diffraction grating can be used to perform the desired D/MUX functions for multiple bands with a simplified network architecture. AWG structures are described further below.

Improved AWG Structure

The improved AWG structures described herein provide D/MUX functions for a plurality of optical bands. Thus, the AWG can provide for the separation of input and output signals associated with de-multiplexed optical connections. As described above the separation, de-multiplexing, from each other of the input and output signals within the respective optical bands provides for simplified optical network architecture. The respective common connections for the two optical bands can be routed through a common coupling waveguide of the AWG or the respective common connections can be connected to opposite coupling waveguides of the AWG.

Figure 8:
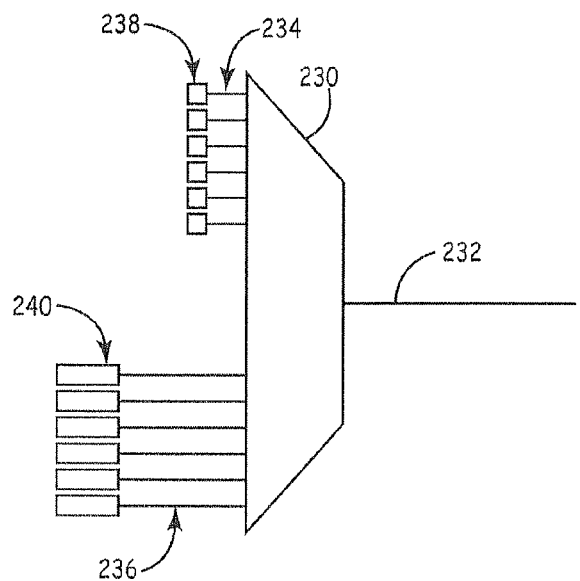
FIG. 8 is a schematic diagram of an AWG integrated into a network based on an embodiment of an improved architecture.

The common optical connections for the plurality of optical bands can be made through a single common optical channel. If a single optical channel is used for the common connection for the two or more optical bands, the configuration of the AWG at an optical network node is shown schematically in FIG. 8. AWG 230 has a connection to common connection 232 that is configured to carry signals associated with a plurality of optical bands. The connection is through a coupling waveguide of the AWG, described further below. Dispersed, i.e., de-multiplexed, connections 234 for a first band and dispersed, i.e., de-multiplexed, connections 236 for a second band are both connected to a second coupling waveguide of the AWG, as described further below. First band connections 234 can be optically coupled to photodetectors 238 for receiving optical communications. Photodetectors 238 can be located at a location at a moderate distance from AWG 230, photodetectors 238 can be located in the immediate vicinity of AWG 230 such that electronic signals are obtained for further processing from the optical communications, photodetectors 238 can be placed at intermediate locations between terminal locations and the immediate vicinity relative to the AWG, or some combination of locations can be used with photodetectors 238 not all being located in comparable locations. Suitable photodetectors include, for example, light sensitive diodes, photomultiplier tubes and the like.

Similarly, second band dispersed connections 236 can be optically connected to suitable light sources 240. As with the photodetectors 238, light sources 240 can be located at a location at a moderate distance from AWG 230, light sources 240 can be located in the immediate vicinity of AWG 230 such that electronic signals are user to generate the output optical communications, light sources 240 can be placed at intermediate locations between terminal locations and the immediate vicinity relative to the AWG, or some combination of locations can be used with light sources 240 not all being directed to comparable locations. Suitable light sources include, for example, light emitting diodes, laser diodes, broadband lasers and the like. In some embodiments, injection locked lasers, amplified sources or the like are used. With the use of an injection locked laser or amplified sources, broadband light received from the common optical connection within the output light band can be input into the AWG, which splits the broadband light for injection into the light source connections. The wavelength selected by the AWG for injection into a light source connection or amplifier results in mode locking of an injection locked laser, amplification of the selected wavelength, or the like, such that the output communication is at the selected wavelength without using a specific tuned light source.

Figure 9:
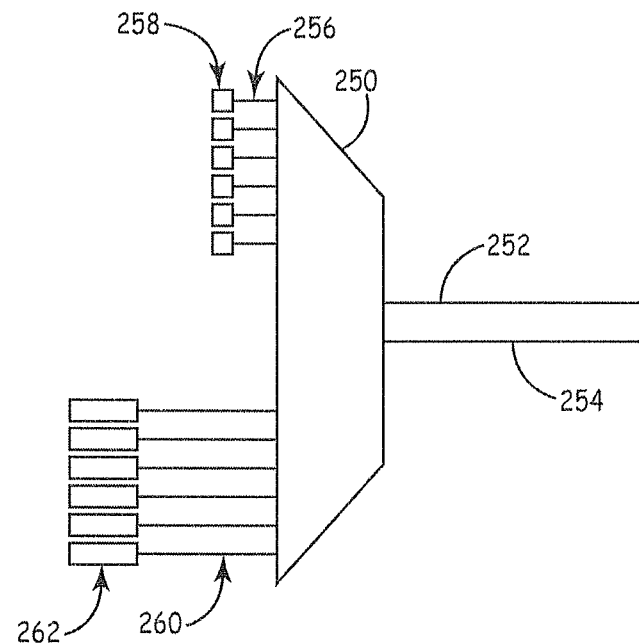
FIG. 9 is a schematic diagram of an alternative embodiment of an AWG integrated into an optical network to provide D/MUX functions with respect to two optical bands.

An alternative embodiment of the D/MUX structure is shown in FIG. 9 in which AWG 250 has common optical connections 252, 254 that are respectively associated with distinct optical bands. Optical signals associated with common optical connection 252 are de-multiplexed with respect to dispersed optical connections 256 that are connected at some location with photodetectors 258. Similarly, optical signals associated with common connection 254 are de-multiplexed with respect to dispersed connections 260 that are connected at some location with light sources 262.

Figure 10:
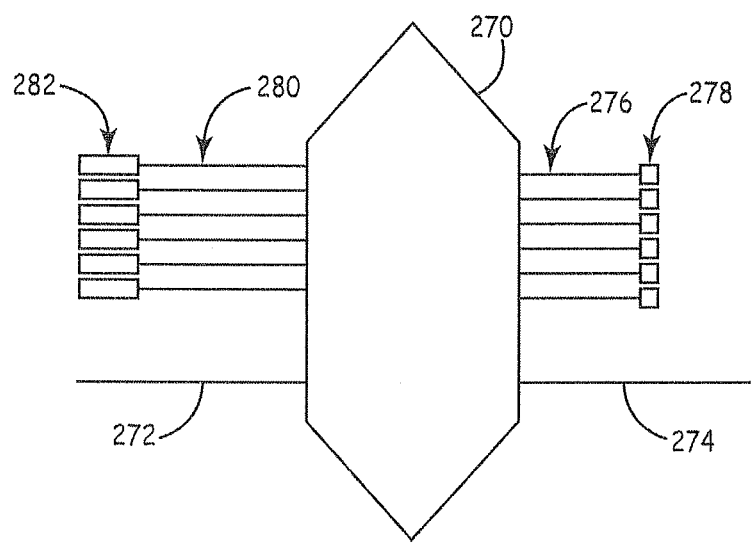
FIG. 10 is a schematic diagram of an embodiment of an AWG configured with two common connections for two optical bands connected to opposite coupling waveguides with corresponding sets of dispersed waveguides.

Another embodiment is shown schematically in FIG. 10. In this embodiment, AWG 270 has one common optical connection 272 associated with a first coupling waveguide, and a second common optical connection 274 associated with a second coupling waveguide. Optical signals associated with common optical connection 272 are de-multiplexed with respect to dispersed of connections 276 that are connected at some location with photodetectors 278. Similarly, optical signals associated with common optical connection 274 are de-multiplexed with respect to dispersed optical connections 280 that are connected at some location with light sources 282. The embodiment of the AWG and associated connections in FIG. 10 has a more symmetric layout than the embodiments in FIG. 8 and FIG. 9. The more symmetric layout of the AWG in FIG. 10 may provide certain production and network connection advantages, such as reduced aberrations from the light being more tightly aligned to the central axis. This embodiment of the AWG and variations thereof are discussed more specifically with respect to AWG structure in the context of FIGS. 11-13, and this more specific discussion can be related the embodiments in FIGS. 8 and 9 with respect to the relevant components.

Figure 11:
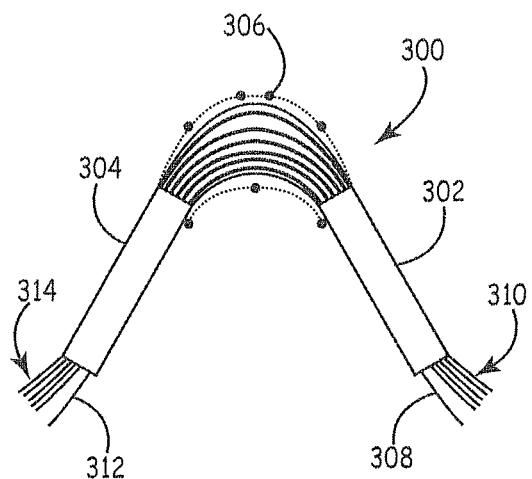
FIG. 11 is a top view of the AWG of FIG. 10 with the elements of the AWG shown.

An AWG structure corresponding to the schematic diagram in FIG. 10 is shown in more detail in FIG. 11. AWG 300 comprises a first coupling waveguide 302, a second coupling waveguide 304 and a waveguide array 306 optically connecting coupling waveguides 302, 304 with waveguides of the array having varying lengths to result in desired wavelength dispersion due to interference. First coupling waveguide 302 is further optically coupled with common connection 308 for an optical band A and dispersed optical connections 310 for an optical band B. Second coupling waveguide 304 is further optically coupled with common connection 312 for optical band B and dispersed connections 314 for optical band A.

First coupling waveguide 302 and second coupling waveguide 304 are respectively configured to interface with waveguide array 306 such that optical interference within the coupling waveguides provides the desired multiplexing and de-multiplexing function. Thus, de-multiplexed signals in optical band A associated with dispersed connections 314 are de-multiplexed with respect to the signal associated with common connection 308 for optical band A. Similarly, de-multiplexed signals in optical band B associated with dispersed connections 310 are de-multiplexed with respect to the signal associated with common connection 312 for optical band B. Aspects of AWG design and construction are described further in U.S. Pat. No. 5,002,350 to Dragone, entitled "Optical Multiplexer/Demultiplexer," incorporated herein by reference.

Figure 12:
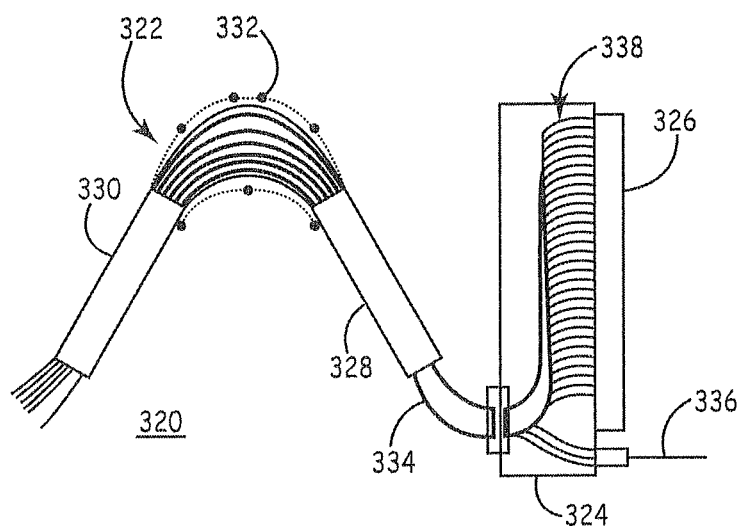
FIG. 12 is a top view of the AWG of FIG. 11 with a set of dispersed waveguide optically connected to an array of photodetectors.

A related embodiment of the optical network node with an AWG with appropriate D/MUX functions is shown in FIG. 12. Referring to FIG. 12, optical node 320 comprises AWG 322, optical fan-out 324 and optical detector array 326. AWG 322 comprises first coupling waveguide 328, second coupling waveguide 330 and waveguide array 332. Optical connections 334, which are optically connected with first coupling waveguide 328 opposite waveguide array 332, are further optically connected with optical fan-out 324. Optical fan-out 324 associates the multiplexed optical signals for optical band A with common optical connection 336. Optical fan-out 324 further spatially separates dispersed optical connections 338 associated with optical band B and directs the dispersed optical connections to corresponding optical detectors within optical detector array 326. Optical detector array comprises a plurality of photodetectors, which may or may not be physically separated from each other. Suitable photodetectors include, for example, photodetectors that can be coupled to an optical fiber. Photodetectors that can be attached onto an edge of a planar optical circuit are described further in U.S. Pat. No. 7,272,273 to Yan et al., entitled "Photodetector Coupled to a Planar Waveguide," incorporated herein by reference. In general, it can be desirable to position the optical detector element proximally to the end of its planar waveguide to directly receive light from that planar waveguide, while still providing convenient access to the electrical connections of the detector element. Typical ways that this can be performed, for example, include the mounting of the photodetector on the edge of the planar optical circuit, positioning of the photodetector spaced a short distance away from the planar optical circuit and relaying the optical output to the detector with desirable optical elements such as lenses, or with another appropriate configuration.

Figure 13:
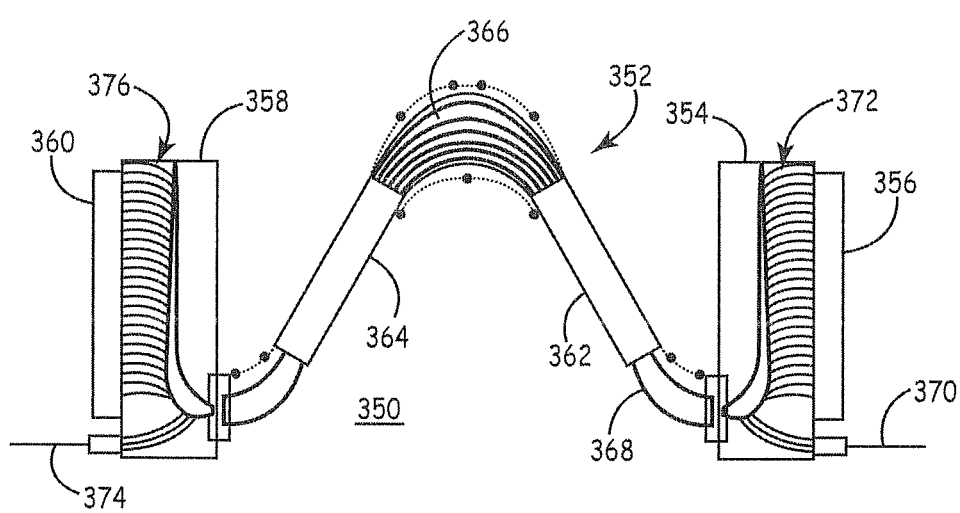
FIG. 13 is a top view of the AWG of FIG. 11 with a first set of dispersed waveguide connected optically connected to an array of photodetectors and a second set of dispersed waveguides optically connected to an array of light sources.

Another related embodiment of an optical network node is shown in FIG. 13. Referring to FIG. 13, optical node 350 comprises AWG 352, first optical fan-out 354, detector array 356, second optical fan-out 358 and light source array 360. AWG 352 comprises first coupling waveguide 362, second coupling waveguide 364 and waveguide array 366. Optical connections 368, which are optically connected with first coupling waveguide 362 opposite waveguide array 366, are further optically connected with optical fan-out 354. First optical fan-out 354 associates the multiplexed optical signals for optical band A with common optical connection 370 and optically couples dispersed optical connections 372 associated with optical band B with corresponding optical detectors within optical detector array 356. Second optical fan-out 358 associates the multiplexed optical signals for optical band B with common optical connection 374. Second optical fan-out 358 further spatially separates dispersed optical connections 376 associated with optical band A and couples the dispersed optical connections to corresponding light sources within light source array 360. Light source array 360 comprises a plurality of light sources, which may be physically separated from each other or may be integrated into one or more composite structures.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. An optical network comprising:
an optical network connection;
a plurality of branch service optical connections; and
a D/MUX structure comprising a dispersing element, the D/MUX structure optically connecting the network connection with the plurality of branch connections,
wherein the plurality of branch connections comprises two groups of optical connections respectively carrying distinct optical bands with a first optical band being used for input into the optical network connection and the second optical band being used for output from the optical network connection and wherein the D/MUX structure provides multiplexing and/or de-multiplexing of distinct bands with respect to the network connection for connection to the plurality of branch connections,
wherein the D/MUX structure comprises a planar optical structure having an arrayed waveguide grating comprising a first coupling waveguide, a second coupling waveguide and a plurality of waveguides in an array optically connecting the first coupling waveguide and the second coupling waveguide wherein the array of waveguides are configured for separation of the plurality of optical bands with the de-multiplexed signals interfaced with the branch service optical connections,
and wherein the optical network comprises two optical common connections that are both optically connected to the first coupling waveguide and wherein the second coupling waveguide is optically connected to branch optical connections associated with the first band and with the second band.

2. The optical network of claim 1 wherein the optical network connection has a single connection interfaced with a network transmission line configured to transmit multiplexed signals for the two optical bands.

3. The optical network of claim 1 wherein the optical network connection comprises two optical connections, wherein a first optical connection is interfaced with a network transmission line configured to transmit multiplexed signals for the first optical band and wherein a second optical connection is interfaced with a network transmission line configured to transmit multiplexed signals for the second optical band.

4. The optical network of claim 1 wherein the branch service optical connections are user service optical connections, wherein each user is configured to interface with a connection associated with the first band and a connection associated with the second band, and wherein the connection to the first band is interfaced with a light source and the connection to the second band is interfaced with a light detector.

5. The optical network of claim 1 wherein a branched service optical connector comprises a planar waveguide and the optical network further comprising an optical detector directly or indirectly connected to the planar optical structure to directly receive light from the planar waveguide associated with the branched service optical connector.

6. The optical network of claim 1 wherein each branched service optical connector comprises a distinct planar waveguide and the optical network further comprising a plurality of optical detectors directly or indirectly connected to the planar optical structure to directly receive light from one of the planar waveguides associated with the branched service optical connectors and wherein the plurality of optical detectors number half of the total number of branched service connectors.

7. The optical network of claim 1 wherein a branched service optical connector comprises a planar waveguide and the optical network further comprising a light source optically coupled to the planar waveguide of the branched service optical connector.

8. The optical network of claim 7 wherein the light source comprises a broadband laser light source optically coupled to an optical fiber that is configured to exchange light with the planar waveguide of the branched service connector and wherein the light source is in the local vicinity of the planar structure.

9. The optical network of claim 1 wherein each branched service optical connector comprises a distinct planar waveguide and the optical network further comprising:
- a plurality of optical detectors directly or indirectly connected to the planar optical structure to directly receive light from one of the planar waveguides associated with the branched service optical connectors and wherein the plurality of optical detectors number half of the total number of branched service connectors; and
- a plurality of light sources each optically connected to separate planar waveguide of the branch service connector such that each waveguide is associated with an optical detector or a light source, wherein the waveguides associated with the optical detectors are configured to transmit light of the first wavelength band and the waveguides associated with the light sources are configured to transmit light of the second wavelength band and wherein the light sources are in the local vicinity of the planar optical structure.

10. A method for interfacing an optical network connection with a plurality of branch service optical connections,
the method comprising providing D/MUX operation with respect to two bands of optical signals associated with the network connection that are interfaced with the plurality of branch connections wherein each of the plurality of branch connections comprise two optical connections carrying distinct bards corresponding with the two hands of the network signal and wherein the distinct bands are optically associated with sets of dispersed waveguides corresponding with each of the optical bands,
with the D/MUX operation comprising
providing an arrayed waveguide grating that comprises a planar substrate, a first coupling waveguide or the planar substrate, a second coupling waveguide on the planar substrate, and a plurality of arrayed waveguides optically connected to the first coupling waveguide and the second coupling waveguide, wherein the arrayed waveguides are configured for the separation of the first wavelength band and the second wavelength band;
exchanging light of a first of the two bands with the arrayed waveguides through a first common connection optically interfaced with the first coupling waveguide; and
exchanging light of a second of the two bands with the arrayed waveguides through a second common connection optically interfaced with the first coupling waveguide;
with the sets of dispersed waveguides being optically interfaced with the second coupling.

11. An arrayed waveguide grating comprising:
a planar substrate;
a first coupling waveguide on the planar substrate;
a second coupling waveguide on the planar substrate;
- a plurality of arrayed waveguides optically connected to the first coupling waveguide and the second coupling waveguide and on the planar substrate;
- a first common connection optically interfaced with the first coupling waveguide opposite the arrayed waveguides with a configuration suitable to exchange light of a first wavelength band with the arrayed waveguides;
- a second common connection optically interfaced with the first coupling waveguide opposite the arrayed waveguides with a configuration suitable to exchange light of a second wavelength band with the arrayed waveguides; and
- a plurality of dispersed waveguides optically interfaced with the second coupling waveguide opposite the arrayed waveguides with a configuration to exchange light of a suitable wavelength with the arrayed waveguides, wherein the arrayed waveguides are configured for the separation of the first wavelength band and the second wavelength band and wherein the plurality of dispersed waveguides comprise groups with a plurality of waveguides corresponding to each optical band.

12. The arrayed waveguide grating of claim 11 further comprising an optical detector directly or indirectly connected to the planar optical structure to directly receive light from a dispersed waveguide.

13. The arrayed waveguide grating of claim 11 wherein the first wavelength band comprises wavelengths in the C band and the second wavelength band comprises wavelengths in the L band and wherein the plurality of dispersed waveguides are spatially grouped into a first set of dispersed waveguides associated with the first wavelength band and a second set of dispersed waveguides associated with the second wavelength band, wherein the first set of dispersed waveguides and the second set of dispersed waveguides are spaced apart from each other.

14. An arrayed waveguide grating comprising:
a planar substrate;
a first coupling waveguide on the planar substrate;
a second coupling waveguide on the planar substrate;
- a plurality of arrayed waveguides optically connected to the first coupling waveguide and the second coupling waveguide and on the planar substrate;
- a common connection optically interfaced with the first coupling waveguide opposite the arrayed waveguides with a configuration suitable to exchange light of two optical wavelength bands with the arrayed waveguides;
- a plurality of dispersed waveguides optically interfaced with the second coupling waveguide opposite the arrayed waveguides with a configuration to exchange light of a suitable wavelength with the arrayed waveguides, wherein the arrayed waveguides are configured for the separation of a plurality of optical bands and wherein the plurality of dispersed waveguides comprise groups with a plurality of waveguides corresponding to each wavelength band; and
an optical detector optically connected to the planar optical structure to directly receive light from a dispersed waveguide.

15. The arrayed waveguide grating of claim 14 further comprising a plurality of additional optical detectors directly or indirectly connected to the planar optical structure to directly receive light from one of the planar waveguides associated with the branched service optical connectors and wherein the total number of optical detectors equal to half of the total number of branched service connectors.

16. An arrayed waveguide grating comprising:
a planar substrate;
a first coupling waveguide on the planar substrate;
a second coupling waveguide on the planar substrate;
a plurality of arrayed waveguide on the planar substrate optically connected to the first coupling waveguide and the second coupling waveguide;
a first set of a plurality of dispersed waveguides optically interfaced with the first coupling waveguide opposite the arrayed waveguides with a configuration suitable to exchange light with the arrayed waveguides; and
a second set of a plurality of dispersed waveguides optically interfaced with the second coupling waveguide opposite the arrayed waveguides with a configuration to exchange light with the arrayed waveguides,
wherein the first set of waveguides comprises a common waveguide for a first optical band and a set of dispersed waveguides for separate de-multiplexed wavelengths from a second optical band, wherein the second set of waveguides comprises a common waveguide for the second optical band and a set of dispersed waveguides for separate de-multiplexed wavelengths from the first optical band, and wherein the arrayed waveguides are configured to perform a D/MUX function with respect to the first optical band between the common waveguide for the first optical band and the set of waveguides for the dispersed modes of the first band as well as to perform a D/MUX function with respect to the second optical band between the common waveguide for the second optical band and the set of waveguides for the dispersed modes of the second optical band.

17. The arrayed waveguide grating of claim 16 further comprising an optical detector directly or indirectly connected to the planar optical structure to directly receive light from a waveguide of the first set dispersed waveguides.

18. An optical network comprising:
an optical network connection;
a plurality of branch service optical connections; and
a D/MUX structure comprising a dispersing element, the D/MUX structure optically connecting the network connection with the plurality of branch connections,
wherein the plurality of branch connections comprises two groups of optical connections respectively carrying distinct optical bands with a first optical band being used for input into the optical network connection and the second optical band being used for output from the optical network connection and wherein the D/MUX structure provides multiplexing and/or de-multiplexing of distinct bands with respect to the network connection for connection to the plurality of branch connections
wherein the D/MUX structure comprises a planar optical structure having an arrayed waveguide grating comprising a first coupling waveguide, a second coupling waveguide and a plurality of waveguides in an array optically connecting the first coupling waveguide and the second coupling waveguide wherein the array of waveguides are configured for separation of the plurality of optical bands with the de-multiplexed signals interfaced with the branch service optical connections
wherein the optical network comprises two optical common connections, wherein a first optical common connection configured to transmit common optical signs for the first band is optically connected to the first coupling waveguide and a second optical common connection configured to transmit common optical signals of the second band is optically connected to the second coupling waveguide, and wherein a first plurality of branch service optical connectors are optically connected with the first coupling waveguide, the first plurality of branch service optical connectors being configured to transmit de-multiplexed second band signals, and wherein a second plurality of branch service optical connectors are optically connected with the second coupling waveguide, the second luralit of branch service optical connectors being configured to transmit de-multiplexed first band signals.

* * * * *

UNITED STATES PATENT AND TRADEMARK OFFICE
CERTIFICATE OF CORRECTION

PATENT NO. : 8,565,600 B2  
APPLICATION NO. : 13/157462  
DATED : October 22, 2013  
INVENTOR(S) : McGreer et al.

Page 1 of 1

It is certified that error appears in the above-identified patent and that said Letters Patent is hereby corrected as shown below:

In the Specification of the Invention:

Col. 8, Line 63 delete "mow" and replace with "arrow"

In the Claims:

Col. 15, Line 39 delete "bards" and replace with "bands"  
Col. 15, Line 40 delete "hands" and replace with "bands"  
Col. 15, Line 46 delete "or" and replace with "on"

Signed and Sealed this  
Third Day of December, 2013

Margaret A. Focarino  
*Commissioner for Patents of the United States Patent and Trademark Office*